(12) United States Patent
Taubin

(10) Patent No.: US 7,847,799 B2
(45) Date of Patent: *Dec. 7, 2010

(54) BI-LEVEL ISO-SURFACE COMPRESSION

(75) Inventor: Gabriel Taubin, Hartsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 116 days.

This patent is subject to a terminal disclaimer.

(21) Appl. No.: 11/692,123

(22) Filed: Mar. 27, 2007

(65) Prior Publication Data

US 2007/0206007 A1 Sep. 6, 2007

(51) Int. Cl.
G06T 17/00 (2006.01)
G06T 15/00 (2006.01)
G06K 9/36 (2006.01)
G06K 9/46 (2006.01)

(52) U.S. Cl. .................. 345/424; 345/419; 345/420; 382/232; 382/233; 382/247

(58) Field of Classification Search .................. 345/419, 345/420, 424, 427; 382/131, 132, 232, 287, 382/233, 247

See application file for complete search history.

(56) References Cited

U.S. PATENT DOCUMENTS

| | | | | |
|---|---|---|---|---|
| 4,710,876 A | * | 12/1987 | Cline et al. | 345/423 |
| 4,719,585 A | * | 1/1988 | Cline et al. | 345/424 |
| 4,879,668 A | * | 11/1989 | Cline et al. | 345/424 |
| 4,905,148 A | * | 2/1990 | Crawford | 382/131 |
| 5,031,053 A | * | 7/1991 | Chamzas et al. | 358/426.11 |
| 5,166,876 A | * | 11/1992 | Cline et al. | 345/424 |
| 5,226,113 A | * | 7/1993 | Cline et al. | 345/424 |
| 5,412,763 A | * | 5/1995 | Knoplioch et al. | 345/424 |
| 5,442,458 A | * | 8/1995 | Rabbani et al. | 382/247 |
| 5,506,947 A | * | 4/1996 | Taubin | 345/441 |
| 5,522,019 A | * | 5/1996 | Bala et al. | 345/424 |

(Continued)

OTHER PUBLICATIONS

Balmelli et al., "Volume warping for adaptive isosurface extraction", Proceedings of the Conference on Visualization '02, IEEE Visualization, 2002, VIS 2002, Oct. 1 Nov. 2002, pp. 467-474.*

(Continued)

*Primary Examiner*—Ulka Chauhan
*Assistant Examiner*—Roberta Prendergast
(74) *Attorney, Agent, or Firm*—Michael J. Buchenhorner; Vazken Alexanian

(57) ABSTRACT

Methods, structures and systems for encoding and decoding isosurface data. An encoder process takes volume data and an isolevel as input and produces compressed isosurface data as output. The compressed isosurface data produced by an encoder process is composed of an occupancy image record, an optional intersection points record, and an optional normal vectors record. An occupancy image is compressed with a context-based arithmetic encoder. Compressed isosurface data can be stored in a data storage device or transmitted through a communication medium to a remote computer system, where the decoder process is executed. The decoder processes take compressed surface data as input and produce surface data as output. The decoder processes first reconstructs the occupancy image by decoding the occupancy image record. An in-core isosurface decoder process produces a polygon mesh as a surface representation. An out-of-core isosurface decoder process produces a set of oriented points as a surface representation.

7 Claims, 15 Drawing Sheets

U.S. PATENT DOCUMENTS

| | | | | |
|---|---|---|---|---|
| 5,784,491 | A * | 7/1998 | Koga | 382/232 |
| 5,793,371 | A * | 8/1998 | Deering | 345/418 |
| 5,825,369 | A * | 10/1998 | Rossignac et al. | 345/440 |
| 5,900,880 | A * | 5/1999 | Cline et al. | 345/423 |
| 5,905,507 | A * | 5/1999 | Rossignac et al. | 345/440 |
| 5,933,153 | A * | 8/1999 | Deering et al. | 345/501 |
| 6,115,048 | A * | 9/2000 | Cline et al. | 345/424 |
| 6,191,796 | B1 * | 2/2001 | Tarr | 345/581 |
| 6,272,366 | B1 * | 8/2001 | Vining | 600/407 |
| 6,556,119 | B1 * | 4/2003 | Lell | 337/157 |
| 6,982,710 | B2 * | 1/2006 | Salomie | 345/420 |
| 7,031,538 | B2 * | 4/2006 | Osher et al. | 382/243 |
| 7,230,616 | B2 * | 6/2007 | Taubin | 345/424 |
| 2003/0052875 | A1 * | 3/2003 | Salomie | 345/419 |
| 2004/0021662 | A1 * | 2/2004 | Taubin | 345/419 |
| 2006/0290695 | A1 * | 12/2006 | Salomie | 345/420 |

OTHER PUBLICATIONS

Deering, M., 1995, "Geometry compression", Proceedings of the 22nd Annual Conference on Computer Graphics and interactive Techniques, S. G. Mair and R. Cook, Eds., SIGGRAPH '95, ACM, New York, NY, pp. 13-20.*

Taubin, G., "Curve and surface smoothing without shrinkage", 1995, Proceedings Fifth International Conference on Computer Vision, pp. 852-857 Jun. 1995.*

Taubin, et al., 1998, "Progressive forest split compression", Proceedings of the 25th Annual Conference on Computer Graphics and interactive Techniques, SIGGRAPH '98, ACM, New york, NY, pp. 123-132.*

Taubin, G., "BLIC: Bi-Level Isosurface Compression", IEEE Visualization, 2002, VIS 2002, Oct. 27-Nov. 1, 2002. pp. 451-458.*

Wood, et al., 2000, "Semi-regular mesh extraction from volumes", Proceedings of the Conference on Visualization '00, IEEE Visualization, IEEE Computer Society Press, Los Alamitos, CA, pp. 275-282.*

Yiliang Bao; Kuo, C.-C.J., "Low complexity binary description wavelet codec," Multimedia Signal Processing, 1999 IEEE 3rd Workshop on , vol., No., pp. 377-382, 1999.*

Moffat, A., Neal, R. M., and Witten, I. H. 1998. Arithmetic coding revisited. ACM Trans. Inf. Syst. 16, 3 (Jul. 1998), 256-294.*

Youngjun Yoo; Younggap Kwon; Ortega, A., "Embedded image-domain adaptive compression of simple images," Signals, Systems & Computers, 1998. Conference Record of the Thirty-Second Asilomar Conference on , vol. 2, No., pp. 1256-1260 vol. 2, Nov. 1-4, 1998.*

Xiaoyu Zhang: Bajaj, C.; Blanke, W., "Scalable isosurface visualization of massive datasets on COTS clusters," Parallel and Large-Data Visualization and Graphics, 2001. Proceedings. IEEE 2001 Symposium on , vol., No., pp. 51-150, Oct. 23, 2001.*

Botsch, et al., "Efficient high rendering of point sampled geometry", Proceedings of the 13th Eurographics Workshop on Rendering (Pisa, Italy, Jun. 26-28, 2002), S. Gibson and P. Debevec, Eds., ACM International Conference Proceeding Series, vol. 28. Eurographics Association, Aire-la-Ville, Switzerland, pp. 53-64.*

Yang, C., "On-The Fly Processing of Compressed Volume Data", Doctoral Thesis, State University of New York at Stony Brook, Nov. 6, 2001, p. 1-59.*

* cited by examiner

JBIG Contexts

1400

InCoreIsosurfaceDecoder (bitstream)
- 1205 — for $\alpha_0 = 0,\ldots,n_0-1$
- 1210 — for $\alpha_1 = 0,\ldots,n_1-1$
- 1215 — for $\alpha_2 = 0,\ldots,n_2-1$
- 1220 — construct context word $c_\alpha$
- 1225 — decode occupancy bit ($b_\alpha/c_\alpha$)
- 1230 — update connectivity
- 1235 — for $j = 0, 1, 2$
- 1240 — if $b_\alpha \neq b_{\alpha-\delta_j}$
- 1410 — set intersection point $t_{\alpha,j} = 0.5$
- 1420 — set normal $n_{\alpha,j}$ = default value
- 1275 — end if
- 1280 — end for
- 1285 — end for
- 1290 — end for
- 1295 — end for
- 1297 — smooth polygon mesh geometry return

OutOfCoreIsosurfaceDecoder (bitstream)

- 1205 — for $\alpha_0 = 0,\ldots,n_0-1$
- 1210 — for $\alpha_1 = 0,\ldots,n_1-1$
- 1215 — for $\alpha_2 = 0,\ldots,n_2-1$
- 1220 — construct context word $c_\alpha$
- 1225 — decode occupancy bit $(b_\alpha/c_\alpha)$
- 1235 — for $j = 0, 1, 2$
- 1240 — if $b_\alpha \neq b_{\alpha-\delta_j}$
- 1250 — decode intersection point $t_{\alpha,j}$
- 1260 — decode normal $n_{\alpha,j}$
- 1510 — construct oriented point $(p_{\alpha,j}, n_{\alpha,j})$
- 1275 — end if
- 1280 — end for
- 1285 — end for
- 1290 — end for
- 1295 — end for return (oriented points)

Fig. 15

BI-LEVEL ISO-SURFACE COMPRESSION

PRIORITY

This application claims priority to a Provisional Application, having the same title, assigned, Ser. No. 60/400,202, and filed Jul. 31, 2002, which is incorporated herein by reference in its entirety for all purposes.

FIELD OF THE INVENTION

This invention relates to the fields of computer graphics and scientific visualization. It is more particularly related to representing isosurface data in compressed form, especially suitable for compact storage and fast transmission, and remote visualization.

BACKGROUND OF THE INVENTION

Polygon meshes are widely used in computer aided geometric design, geometric modeling, medical imaging, and computer graphics to represent surfaces in digital form. Polygon meshes are described in detail in U.S. Pat. No. 5,506,947 "Curve and Surface Smoothing Without Shrinkage," by G. Taubin, and in the paper "A Signal Processing Approach To Fair Surface Design," by G. Taubin, Siggraph'95 Conference Proceedings, August 1995, pages 351-358, both are incorporated herein by reference in its entirety for all purposes. A polygon mesh includes a polygon mesh connectivity, a set of polygon mesh vertex positions, and a set of polygon mesh normals. The polygon mesh connectivity includes a plurality of vertices, and a plurality of faces. The set of polygon mesh vertex positions includes a plurality of vertex position vectors, with each vertex position vector corresponding to one vertex of the polygon mesh connectivity. The set of polygon mesh normals can be either a set of polygon mesh vertex normals or a set of polygon mesh face normals. The set of polygon mesh vertex normals includes either a plurality of vertex normals, with each vertex normal corresponding to one vertex of the polygon mesh connectivity. The set of polygon mesh face normals includes either a plurality of face normals, with each face normal corresponding to one face of the polygon mesh connectivity.

An isosurface extraction algorithm constructs a polygon mesh approximation of a level.set of a scalar function defined in the volume spanned by a 3D regular grid. Data acquired by medical imaging systems such as Computed Axial Tomography (CAT) Scanners and Magnetic Resonance Imaging (MRI) Scanners are example of scalar functions defined on the vertices of a 3D regular grid. The 3D regular grid includes a plurality of grid vertices and a plurality of grid edges, with each grid edge connecting two particular grid vertices. Two grid vertices connected by a grid edge are called neighbors. The grid vertices of the 3D regular grid are points $P_\alpha$ in 3D space, where $\alpha=(\alpha_0,\alpha_1,\alpha_2)$ is a triple of non-negative integers, $\alpha_0 \in \{0, \ldots, n_0-1\}, \alpha_1 \in \{0, \ldots, n_1-1\}, \alpha_2 \in \{0, \ldots, n_2-1\}$. FIG. 1 is a prior art diagram showing a 3D regular grid 100 and one of its cells 140. The grid vertices of the 3D regular grid are organized as $n_0$ layers 110, $n_1$ rows 120, and $n_2$ columns 130. Each set of eight neighboring grid vertices form a cell 140

$$C_\alpha = \{P_\alpha \cdot P_{\alpha-(001)} \cdot P_{\alpha-(010)} \cdot P_{\alpha-(011)} \cdot P_{\alpha-(110)} \cdot P_{\alpha-(111)}\}$$

The cells of the 3D regular grid correspond to values of $\alpha=(\alpha_0, \alpha_1, \alpha_2)$ in the following ranges: $\alpha_n \in \{1, \ldots, n_0-1\}$, $\alpha_1 \in \{1, \ldots, n_1-1\}, \alpha_2 \in \{1, \ldots, n_2-1\}$. The vertices of cell 140 are grid vertices 141, 142, 143, 144, 145, 146, 147, and 148.

The scalar function $f_{(P)}$ is specified by its values $f_\alpha = f_{(P_\alpha)}$ on the grid vertices $P_\alpha$ of a 3D regular grid, and by a method to interpolate in between these values. The level set is specified by an isovalue $f_0$. The interpolation scheme is assumed to be linear along the grid edges, so that the isosurface cuts each edge in no more than one point. If $$P_\alpha \text{ and } P_{\alpha-\delta_1}$$

are grid points connected by an edge, and $$f_\alpha > f_0 > f_{\alpha-\delta_1} \text{ or } f_\alpha < f_0 < f_{\alpha-\delta_1},$$

the location of the point $P_{\alpha,j}$ where the isosurface intersects the edge is given by the formula $$p_{\alpha,j} = (1-t_{\alpha,j})p_\beta + t_{\alpha,j}p_\alpha \text{ where } t_{\alpha,j} = \frac{f_\beta - f_0}{f_\beta - f_\alpha}$$

The isosurface extraction algorithm determines interfaces between adjacent data values indicating a change in the measured value, and then models the surface with polygonal elements having a vertex position for each polygon mesh vertex, and a vector normal to the surface at each of the vertices, or a face normal to the surface at each polygonal face of the polygon mesh. The most popular isosurface algorithms are Cuberille, described by L. S. Chen, G. T. Herman, R. A. Reynolds, and J. K. Udupa in the paper "Surface Shading in the Cuberille Environment," IEEE Computer Graphics and Applications, vol. 5, no. 12, pages 33-42, 1985; and Marching Cubes, described in detail in U.S. Pat. No. 5,166,876 "System and Method for Detecting Internal Structures Contained Within the Interior Region of a Solid Object," by H. E. Cline and W. E. Lorensen, and in the paper "Marching Cubes: a High Resolution 3D Surface Construction Algorithm," Siggraph Conference Proceedings, 1987, by W. E. Lorensen and A. V. Cline. In this disclosure we refer to the polygon meshes produced by these and related algorithms as isosurface meshes.

In the Marching Cubes method mentioned above the points defined by the intersection of the isosurface with the grid edges are the vertices of the polygon mesh. In the Cuberille method mentioned above each of the points defined by the intersection of the isosurface with the grid edges correspond to one polygon mesh face. In his PhD thesis "Segmentation and Surface-Based Modeling of Objects in Three-Dimensional Biomedical Images," New York University, New York, March 1991, A. D. Kalvin observed that the polygon mesh generated by Marching Cubes is the dual mesh of the quadrilateral mesh generated by the Cuberille algorithm. Each vertex of the grid where the scalar function is specified (the primal grid) is the centroid of a dual grid cell, or voxel. Every edge of the primal grid intersects the common face of the two voxels corresponding to the ends of the edge. The mesh generated by the Cuberille algorithm is the regularized (converted to manifold) boundary surface of the solid defined by the set of voxels corresponding to grid vertices with scalar value above the isovalue. Without regularization, in general this mesh is highly singular (non-manifold). The conversion to manifold requires duplication of vertices and edges, so that in the resulting mesh every edge has exactly two incident faces. Which vertices to duplicate and how to connect the faces can be determined by virtually {\em shrinking} the solid, moving the faces in the direction of the inside. The multiplicity of each dual grid vertex in the regularized mesh only depends on the local connectivity of the eight incident voxels. Again, the regularization can be done by table lookup while the volume data is being scanned, with a table of size 256.

The vertices of the polygon mesh generated by the Marching Cubes method are connected forming polygon faces according to the following procedure. Since the function value associated with each of the eight corners of a cell may be either above or below the isovalue (isovalues equal to grid function values are called singular and should be avoided), there are 256 possible configurations. A polygonization of the vertices within each cell for each one of these configurations is stored in a static lookup table. When symmetries are taken into account, the size of the table can be reduced quite significantly.

The Cuberille algorithm constructs its isosurface mesh from the same information as the Marching Cubes algorithm. The edge intersections in the primal mesh specify the location of the face centroids of the Cuberille mesh. The location of the cuberille vertices can then be computed by local averaging, or by using more accurate schemes, such as those introduced by S. Gibson in the paper "Constrained Elastic Surface Nets: Generating Smooth Surfaces From Binary Segmented Data," Medical Image Computation and Computer Assisted Interventions, Conference Proceedings, pages 888-898, 1998; and by G. Taubin in the paper "Dual Mesh Resampling," Pacific Graphics 2001, Conference Proceedings, Tokyo, Japan, October 2001. The situation is similar for normals. If computed in the server as the gradient of the scalar function at the edge intersection points, and included in the compressed data, the Marching Cubes decoder will treat them as vertex normals, and the Cuberille decoder as face normals. T. Moller, R. Machiraju, K. Muller, and R. Yagel discuss different methods to estimate isosurface normals from volume data in the paper "A Comparison of Normal Estimation Schemes," IEEE Visualization'97, Conference Proceedings, pages 19-26, 1997. If the normals are not included in the compressed data, then it is up to the client to decide how to estimate them from the vertex coordinates and the connectivity information. The implication of these observations is that there is considerable freedom in the implementation of the decoder, making absolutely no changes to the encoder or the compressed bitstream. It is not even necessary for the decoder to produce a polygon mesh as output. For visualization purposes, and in particular if normals are included in the compressed data, a point-based approach could be very effective. One such point based surface representation approach is described by S. Rusinkiewicz and M. Levoy in the paper "Qsplat: A Multiresolution Point Rendering System for Large Meshes," Siggraph Conference Proceedings, 2000. Another related method is described in U.S. Pat. No. 4,719,685 "Dividing Cubes System And Method For The Display Of Surface Structures Contained Within The Interior Region of a Solid Body," by H. E. Cline, W. E. Lorensen, and S. Ludke.

A number of general purpose polygon mesh compression algorithms have been proposed in recent years. M. F. Deering developed a mesh compression scheme for hardware acceleration, described in U.S. Pat. No. 5,793,371 "Method and apparatus for geometric compression of three-dimensional graphics data," and U.S. Pat. No. 5,842,004 "Method and apparatus for decompression of compressed geometric three-dimensional graphics data." Other methods to encode the connectivity of triangle meshes with no loss of information were introduced by Taubin and Rossignac in U.S. Pat. No. 5,825,369 "Compression of Simple Geometric Models Using Spanning Trees," and U.S. Pat. No. 5,905,507 "Compression of Geometric Models Using Spanning Trees;" C. Touma and C. Gotsman in U.S. Pat. No. 6,167,159 "Triangle Mesh Compression;" J. Rossignac in the paper "Edgebreaker: Connectivity Compression for Triangular Meshes," IEEE Transactions on Visualization and Computer Graphics, vol. 5, no. 1, pp. 47-61, January-March 1999; S. Gumhold in U.S. Pat. No. 6,469,701 "Method for Compressing Graphical Information;" and others.

In the Technical Report GIT-GVU-99-36, "Connectivity Compression for Irregular Quadrilateral Meshes," Georgia Tech GVU, 1999, A. King, D. Szymczak and J. Rossignac describe a method to compress quadrilateral meshes. Methods to encode the connectivity of polygon meshes composed of faces with arbitrary number of corners were introduced by M. Isenburg and J. Snoeyink in the paper "Face fixer: Compressing Polygon Meshes with Properties," Siggraph 2000 Conference Proceedings, pages 263-270, July 2000; B. Konrod and C. Gotsman in the paper "Efficient Coding of Non-Triangular Meshes," Pacific Graphics Conference Proceedings, Hong-Kong, 2000; and A. Khodakovsky, P. Alliez, M. Desbrun, and P. Schroder in the paper "Near-Optimal Connectivity Encoding of 2-Manifold Polygon Meshes," Graphical Models, Special Issue on Processing of Large Polygonal Meshes, 2003. These algorithms focus on compressing the connectivity information very efficiently, and are all based on a traversal of the primal or dual graph of the mesh. Some of them compress connectivity of very regular meshes to a small fraction of a bit per vertex, and all to 2-4 bits per vertex in the worst case. When the geometry information (vertex coordinates, and optionally normals, colors, and texture coordinates) is also taken into account, the cost per vertex increases considerably. For example, adding only vertex coordinates quantized to 10 bits per vertex lifts the cost to typically 8-16 bits per vertex. In addition, all of these approaches are incompatible with the out-of-core nature of isosurface extraction algorithms that visit the voxels in scan order.

In the paper "Progressive Geometry Compression," Siggraph 2000 Conference Proceedings, pages 271-278, July 2000, A. Khodakovsky, P. Schroder, and W. Sweldens follow a different approach to compress large connected and uniformly sampled meshes of low topological complexity, based on resampling, subdivision and wavelets. They obtain up to one order of magnitude better compression rates than with the connectivity preserving schemes, by approximating the mesh geometry with a subdivision mesh, and compressing this mesh instead.

In the paper "Semi-Regular Mesh Extraction From Volumes," IEEE Visualization 2000, Conference Proceedings, pages 275-282, October 2000, Z. J. Wood, M. Desbrun, P. Schroder, and D. Breen introduced a method based on surface wave propagation to extract isosurfaces from distance volumes that produces semi-regular multi-resolution meshes. These meshes can be compressed with Khodakovsky's wavelet-based scheme.

Isosurface algorithms generally, take as input very large volume data files, and produce polygon meshes with very large number of vertices and faces. Data stored in a server can be transmitted to a client for remote visualization. The server can store and transmit the volume data to the client, which then executes the isosurface algorithm on the received volume data, and renders the resulting polygon mesh in a visualization system. Alternatively, the server can compute the isosurface and transmit the resulting polygon mesh to the client, which only renders the received polygon mesh in a visualization system.

In both cases the transmission time constitutes a major bottleneck because of the large file sizes involved. In the first case, in addition to the size of the transmitted data, the burden of the computation is shifted to the client. In the second case this is true even using general purpose polygon mesh compression schemes to reduce the size of the transmitted data. It is, therefore, important to compress the data stored in the server and/or transmitted to a remote client, and to be able to divide the computational burden between server and client according to the computational resources of the client.

All isosurface construction algorithms construct an isosurface approximation from an occupancy image, a set of intersection points, and a set of intersection point surface normals. The occupancy image, the set of intersection points, and the set of intersection point surface normals are extracted from the volume data. Since whether a grid edge intersects the isosurface or not depends on the values of the scalar function at the grid edge ends, isosurface construction algorithms generate polygon mesh vertices an faces as a function of an "occupancy image" extracted from the volume data. The occupancy image is a 3D binary image defined by one grid vertex bit per grid vertex $$B=\{b_\alpha:\alpha=(\alpha_0,\alpha_1,\alpha_2)\} \text{ where } b_\alpha \in \{0,1\},$$

specifying whether the scalar function attains a value above or below the isovalue on that grid vertex. The location of the surface points along the intersecting grid edges and the polygon mesh normals are associated with the intersecting grid edges. A grid edge is an intersecting grid edge if occupancy image has different values at the grid edge ends. Since the gradient vector of a function is normal to its level sets, normals used for shading can optionally be computed during the volume traversal as finite difference approximations to the gradient vectors normalized to unit length.

FIG. 2 is a flow chart of a typical prior art isosurface extraction algorithm 210 which takes volume data 205 as input and produces surface data 220 as output. While the isosurface extraction algorithm 210 scans the volume data in step 215, it determines the occupancy image in step 230, computes the intersection points in step 235, computes normal vectors to the intersection points in step 240, and from the information contained in the occupancy image, intersection points, and normal vectors, in step 245 it computes a surface representation that returns as the surface data 220.

FIG. 3 is a prior art diagram that shows the occupancy image 300 composed of grid vertex bits 310, each grid vertex bit 310 corresponding to a grid vertex 320, each grid vertex 320 having an associated scalar function value 330, the value of the grid vertex bit 310 being determined by whether the associated scalar function value 330 is greater than the isovalue 340. In this diagram each grid points 320 corresponds to a voxel 350 as in the Cuberille algorithm. The occupancy image partitions the voxels into two sets 360 and 370. The topology and connectivity of the isosurface 370 is determined by the set of voxel faces separating the sets 360 and 370.

FIG. 4 is a prior art diagram that shows the intersection points. Each intersection point 410 corresponds to one quadrilateral face 420 separating the sets 360 and 370 of FIG. 3.

FIG. 5 is a prior art diagram that shows the normal vectors. Each normal vector 520 corresponds to one intersection point 510.

In the paper "Compression of Isosurfaces," Proceedings of IEEE Vision, Modeling and Visualization (VMV 2001), Stuttgart, Germany, November 2001, D. Saupe and J.-P. Kuska presented an algorithm to compress isosurfaces, which extracts and encodes the occupancy image and intersection points. Normals are computed from the reconstructed Marching Cubes polygon mesh. The occupancy image is encoded with an octree-based scheme to deal more efficiently with large homogeneous regions of empty space. The intersection points are encoded with a multi-symbol context-based arithmetic coder. This is a complex method with compression rates significantly higher than those achieved using this invention. In the paper "Space-Efficient Boundary Representation of Volumetric Objects," Proceedings of the Joint Eurographics-IEEE TCVG Symposium on Visualization (VisSym01), Ascona, Switzerland, May 2001, L. Mroz and H. Hauser encode the occupancy image using a more complex scheme based on chain coding, where the voxels that contain isosurface intersections are linked in long chains and represented as a sequence of symbols, each one specifying in which direction to go to visit the next cell. This method is also significantly less efficient than this invention, even if normals are not included in the compressed data. In the paper "Compressing Isosurfaces Generated with Marching Cubes," The Visual Computer, vol. 18, no. 1, pages 54-67, 2002, S. N. Yang and T. S. Wu describe a rather complex method to compress triangle meshes generated by the Marching Cubes algorithm. Each mesh vertex is represented by the index of the containing cube, the index of the supporting edge, and the position of the vertex along the supporting edge. The decoder interconnects these vertices forming triangles using the occupancy image, as in the original Marching Cubes method. But the occupancy image is not encoded in the bitstream. Instead, it is reconstructed from the cube and edge indices in the encoding of mesh vertices by a complex procedure that in fact determines the connected components of the grid graph after removing the edges where mesh vertices are supported. Normal vectors are not compressed. Compression rates are several times worse than with the method of this invention, and it is not possible to do an out-of-core implementation.

Entropy encoding is a well established technique to represent with a minimum number of bits a finite sequence of "independent symbols" that belong to a finite "alphabet". The fundamentals of entropy encoding is explained by D. Salomon in the book "Data Compression: The Complete Reference," Springer-Verlag, 1997, ISBN 0-387-98280-9. Symbols that appear more often in the sequence are represented with fewer bits than those that appear more infrequently. The absolute lower bound for the total number of bits necessary to represent the sequence of independent symbols with no loss of information is given by the so-called "entropy." In practice the "arithmetic coder," described by I. H. Witten, R. M. Neal, and J. G Cleary, in the paper "Arithmetic coding for data compression," Communications of the ACM, vol. 30, no. 6, June 1987, asymptotically achieves the entropy. Arithmetic coding is used as the basis of many image and data compression schemes and applications, such as those described by K. M. Marks, in the paper "A JBIG-ABIC compression engine for digital document processing," IBM Journal of Research and Development, vol. 42, no. 6, 1998. Arithmetic coding has also been implemented in hardware, as described by M. J. Slattery and J. L. Mitchell, in the paper "The Qx-coder," IBM Journal of Research and Development, vol. 42, no. 6, 1998.

To deal with the lack of stationary distribution of symbols in the sequence, "adaptive" models are used. In arithmetic coding with an adaptive model the encoder updates the alphabet probabilities after encoding each symbol. Since encoder and decoder must use the same model to encode and decode each symbol, the model update procedure must be based on data previously encoded, and agreed upon information. Among these data are the initial probabilities, which may be hard-coded or included in the compressed data. A common practice is to start with uniform probabilities and keep track of the relative symbol frequencies as probability estimates.

For binary data, where the alphabet is composed of two symbols, keeping track of global symbol frequencies is usually not good enough as a model update procedure, and a "context-based" procedure is used. This is a state machine model with separate sets of probability estimates associated with each state or "context". The update procedure determines the context from previously encoded data, and after the symbol is encoded with the probabilities associated with a context, the set of probabilities corresponding to that context is updated, but not the other. Context-based arithmetic coding is a very efficient adaptive compression scheme.

JBIG is short for "Joint Bi-level Image experts Group." This is both the name of a standards committee, and of a particular scheme for the lossless compression of binary images, described in the international standard ITU-T T.82 Information technology—Coded representation of picture and audio information—Progressive bi-level image compression, March 93. It can also be used for coding gray scale and color images with limited numbers of bits per pixel. JBIG is one of the best available schemes for lossless image compression. The JBIG algorithm is based on context-based arithmetic coding. For each pixel in an image a "context" is derived from a specific fixed pattern of surrounding pixels preceding the current pixel in the scan order. The standard defines several such neighborhoods.

FIG. 6 is a prior art diagram showing two different ways 620 and 630 of defining a 10-bit context of a bit 610 described in the JBIG standard. All the above mentioned papers and references are incorporated herein for all purposes.

SUMMARY OF THE INVENTION

An aspect of this invention is provision of encoding systems and methods for compressing isosurface data.

A second aspect of this invention is provision of out-of-core decoding systems and methods for decompression of compressed isosurface data.

A third aspect of this invention is provision of in-core decoding systems and methods for decompression of compressed isosurface data.

Thus, this invention provides methods, apparatus and systems for a new and simple algorithm to compress isosurface data. This is the data extracted by isosurface algorithms from scalar functions defined on volume grids, and used to generate polygon meshes or alternative representations. Isosurfaces are in widespread use in medical imaging, and scientific computation. The main features of this invention are its extreme simplicity and high compression ratios, which are 5 to 25 times better than those obtained with general purpose mesh compression schemes.

In this algorithm the mesh connectivity and a substantial proportion of the geometric information are encoded to a fraction of a bit per Marching Cubes vertex with a context based arithmetic coder closely related to the JBIG binary image compression standard. The remaining optional geometric information, in the form of one quantized scalar value per intersecting grid edge, and specifying the location the corresponding Marching Cubes vertex more precisely, is efficiently encoded in scan-order with the same mechanism. Vertex normals can optionally be computed as normalized gradient vectors by the encoder and included in the bitstream after quantization and entropy encoding, or computed by the decoder in a postprocessing smoothing step. These choices are determined by tradeoffs associated with an in-core vs. out-of-core decoder structure.

An in-core isosurface decoder process produces a polygon mesh as a surface representation. This decoder process takes as input a compressed isosurface data with neither the optional intersection points record nor the normal vectors record. In this decoder the normalized intersection points are set to the default value one half, the normal vectors are given default values as a function of the neighboring intersection point values. A subsequent smoothing algorithm is used as a global predictor to improve the quality of the reconstructed polygon mesh.

The out-of-core isosurface decoder process produces a set of oriented points as a surface representation. This decoder process takes as input a compressed isosurface data with the optional intersection points record and the normal vectors record. Immediately after decoding and reconstructing each intersection point and corresponding normal vector, this decoder process generates one oriented point.

BRIEF DESCRIPTION OF THE DRAWINGS

These and other objects, features, and advantages of the present invention will become apparent upon further consideration of the following detailed description of the invention when read in conjunction with the drawing figures, in which:

FIG. 14 is a flow chart of an in-core more advantageous embodiment of the isosurface decoder process of FIG. 12, which produces a polygon mesh as a surface representation; and FIG. 15 is a flow chart of an out-of-core more advantageous embodiment of the isosurface decoder process of FIG. 12, which produces a set of oriented points as a surface representation.

DETAILED DESCRIPTION OF THE INVENTION

Figure 1:
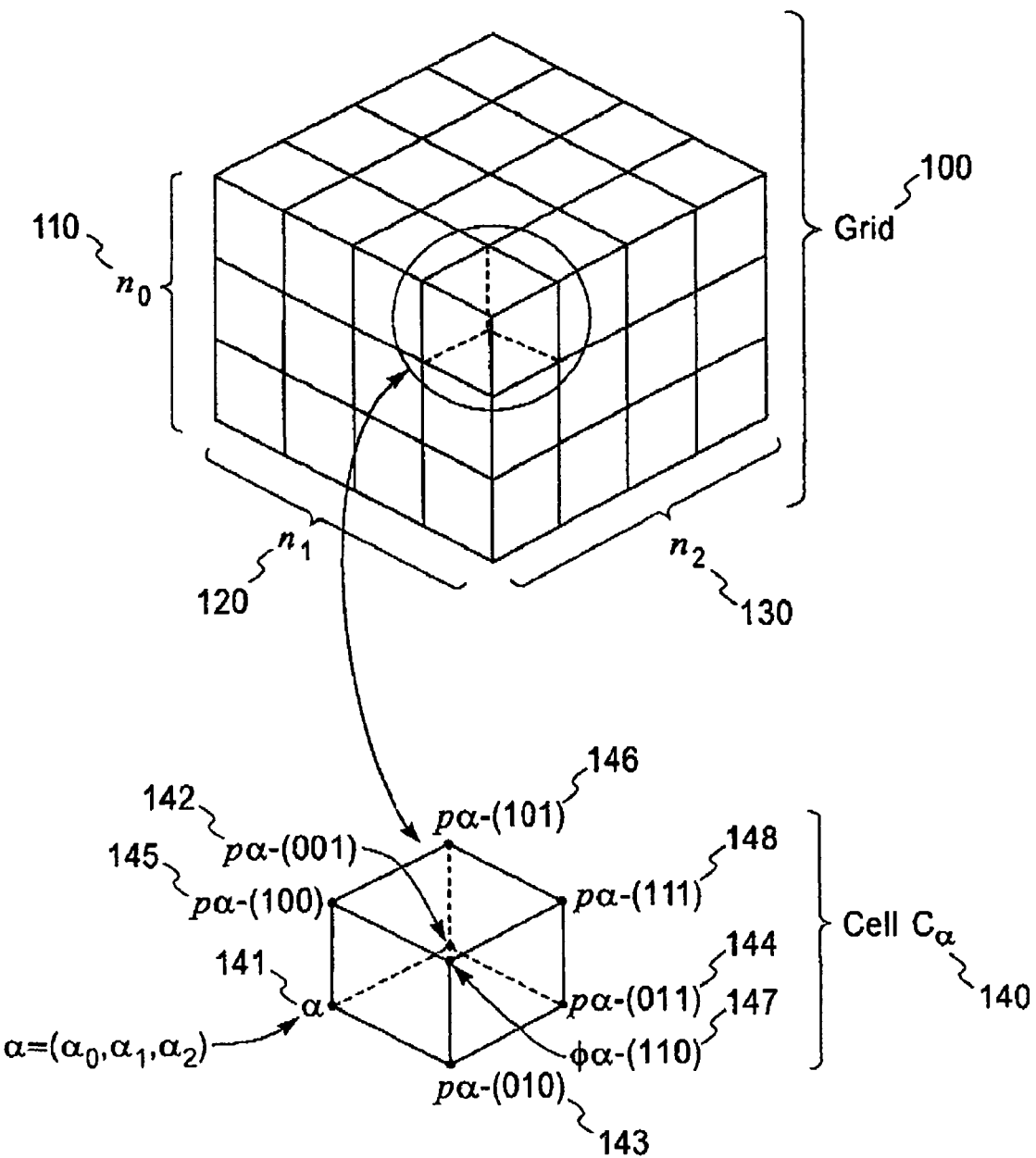
FIG. 1 is a prior art diagram showing a 3D regular grid and one of its cells.
Figure 2:
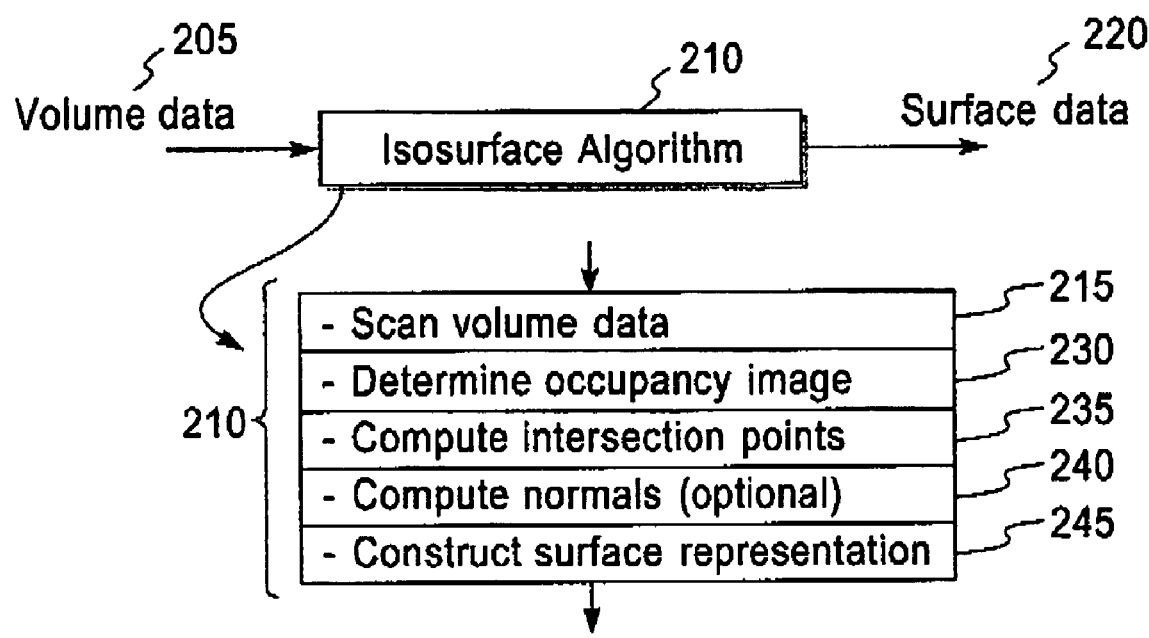
FIG. 2 is a flow chart of a typical prior art isosurface extraction algorithm.
Figure 3:
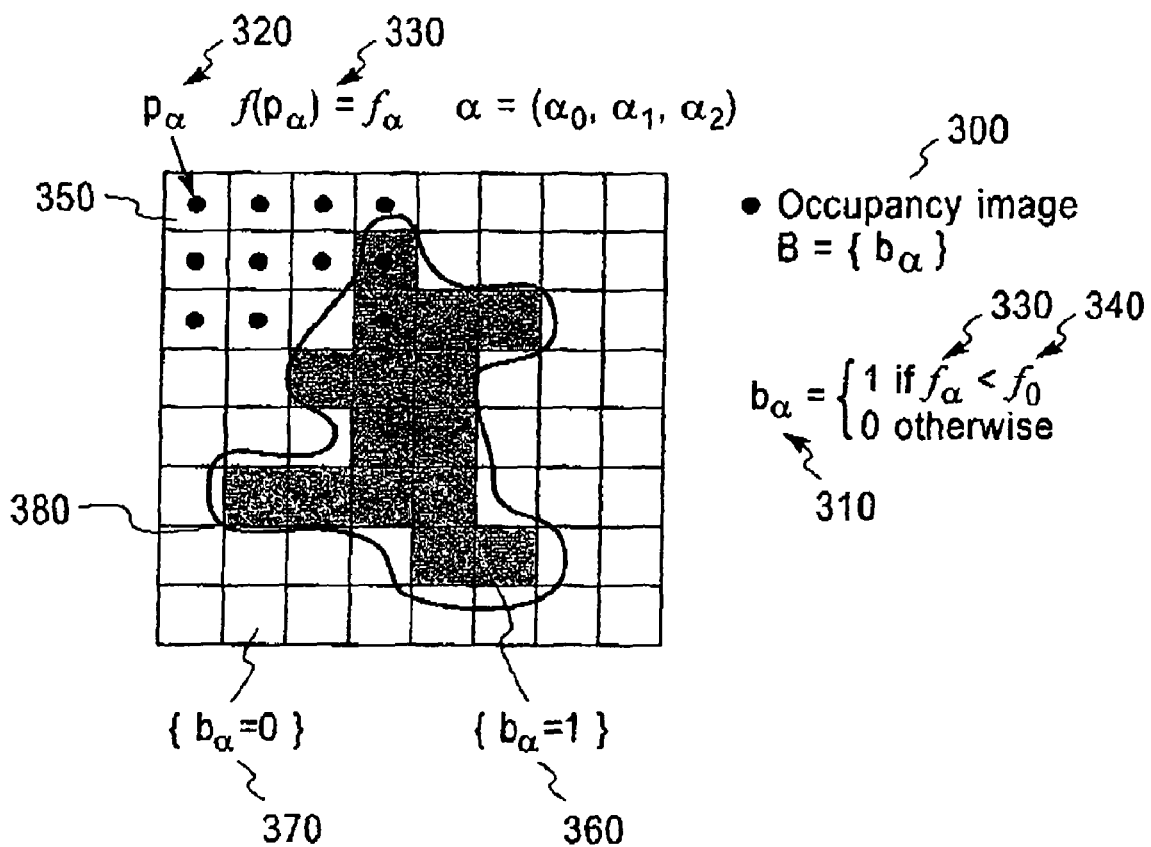
FIG. 3 is a prior art diagram that shows the occupancy image.
Figure 4:
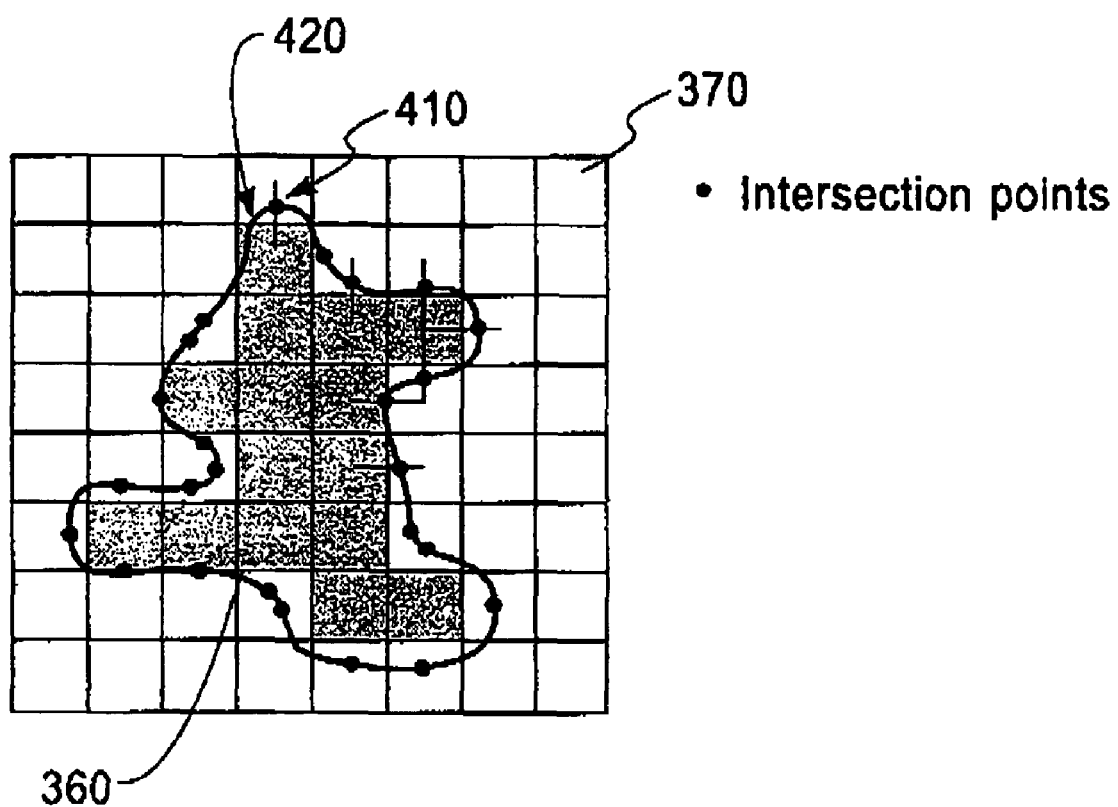
FIG. 4 is a prior art diagram that shows the intersection points.
Figure 5:
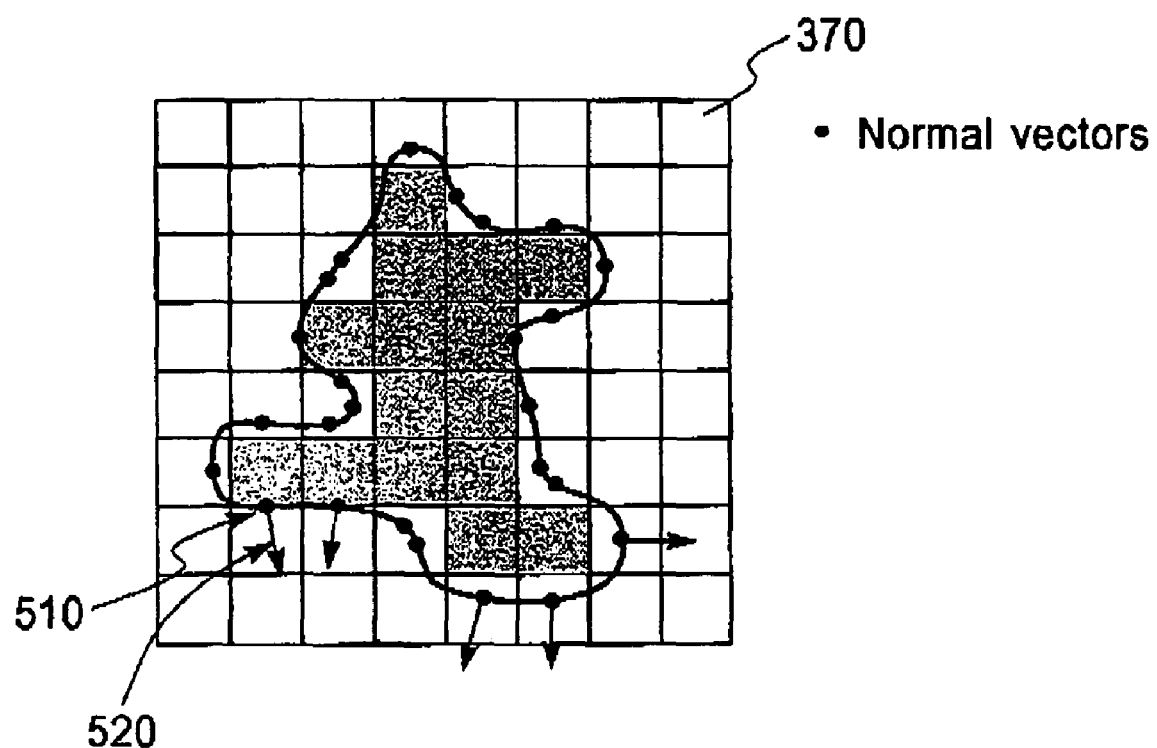
FIG. 5 is a prior art diagram that shows the normal vectors.
Figure 6:
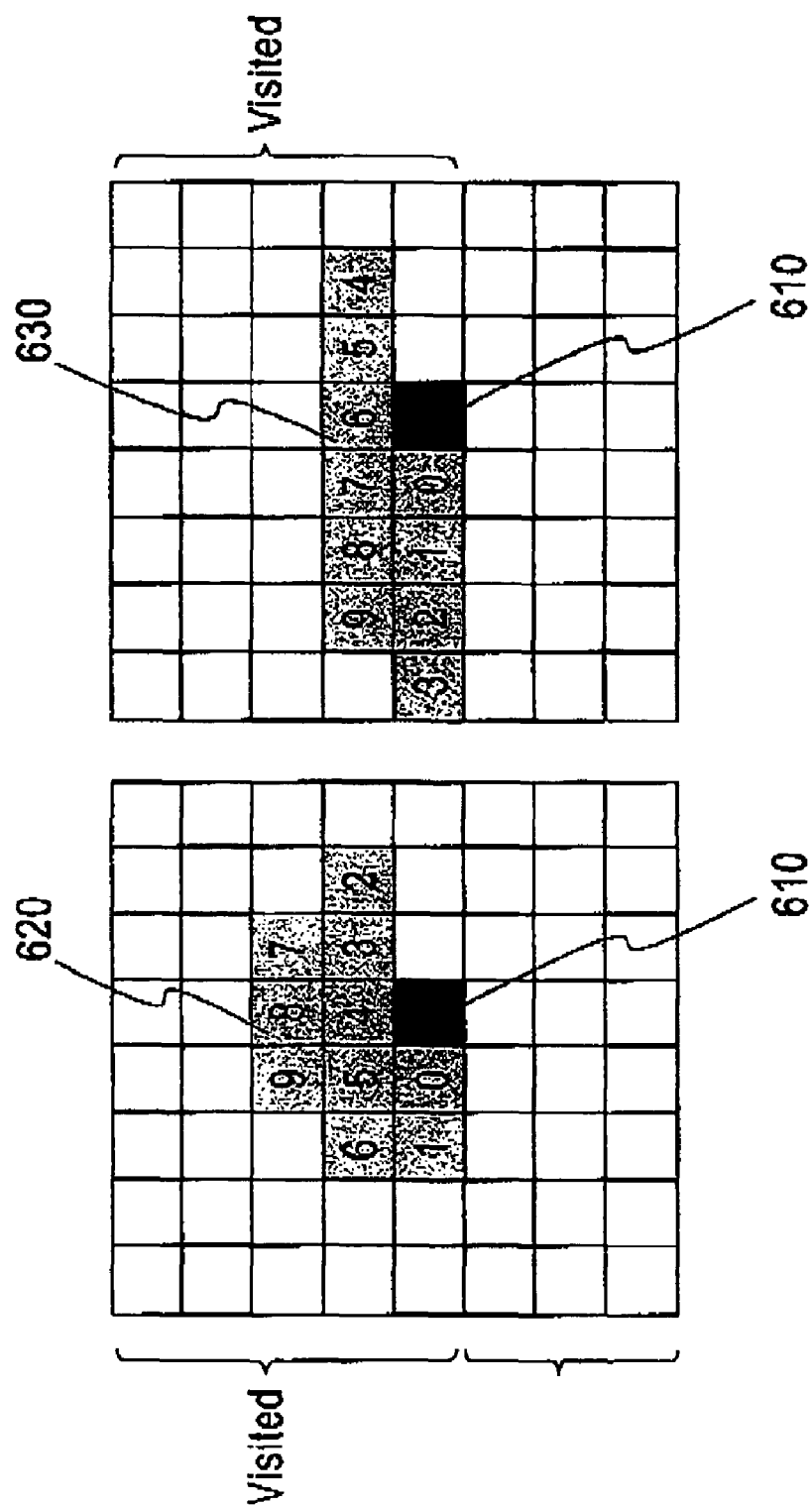
FIG. 6 is a prior art diagram showing different ways of defining a context of a bit described in the JBIG standard.

This invention provides systems, structures, apparatus and methods for 'Bi-level iso-surface compression', (BLIC). It provides encoding systems and methods for compressing isosurface data, out-of-core decoding systems and methods for decompression of compressed isosurface data, and in-core decoding systems and methods for decompression of compressed isosurface data.

An encoder process takes volume data and an isolevel as input and produces compressed isosurface data as output. The volume data comprising the values of a scalar function evaluated at the grid vertices of a 3D regular grid. The 3D regular grid also having grid edges, with each grid edge having two neighboring grid vertices as edge ends. The volume data being organized as layers, rows, and columns. The compressed isosurface data including sufficient information to reconstruct a surface approximation to the level set of the scalar function associated with the isolevel in the volume spanned by the 3D regular grid. The compressed isosurface data produced by the encoder process is composed of an occupancy image record, an optional intersection points record, and an optional normal vectors record. The occupancy image record including a compressed occupancy image. The occupancy image being a binary image with values corresponding to the grid vertices of the 3D regular grid and determined by thresholding the values of the scalar function at the vertices of the 3D regular grid with respect to the isovalue. The occupancy image compressed with a context-based arithmetic encoder. Each current grid vertex encoded with respect to a current context word. The context word being a binary word with a finite number of bits. The bits of the binary word being determined by preceding neighboring values of the occupancy image corresponding to grid vertices that precede and are neighbors of the current grid vertex in the scan order. The preceding neighboring values belonging to one or more layers, one or more rows, and one or more columns of the volume data. The optional intersection points record including a set of normalized intersection parameters. Each normalized intersection parameter being a number between zero and one, and specifying the location of a corresponding intersection point along a corresponding intersection edge. The intersection edges being grid edges. A grid edge being an intersection edge if the values of the occupancy image corresponding to its ends are different. The optional normal vectors record including a set of compressed intersection point normal vectors. Each intersection point normal vector computed from the volume data.

The compressed isosurface data can be stored in a data storage device or transmitted through a network or other communication medium to a remote computer system, where the decoder process is executed. The decoder processes take compressed surface data as input and produce surface data as output. The decoder processes first reconstructs the occupancy image by decoding the occupancy image record. The decoder processes then determines the intersection edges and either decodes the intersection points and corresponding normal vectors from the intersection points record and normal vectors record, respectively, if present in the compressed isosurface data. Otherwise the decoder process assigns default values to the intersection points and corresponding normal vectors.

The in-core isosurface decoder process produces a polygon mesh as a surface representation. This decoder process takes as input a compressed isosurface data with neither the optional intersection points record nor the normal vectors record. In this decoder the normalized intersection points are set to the default value one half, the normal vectors are given default values as a function of the neighboring intersection point values. A subsequent smoothing algorithm is used as a global predictor to improve the quality of the reconstructed polygon mesh.

The out-of-core isosurface decoder process produces a set of oriented points as a surface representation. This decoder process takes as input a compressed isosurface data with the optional intersection points record and the normal vectors record. Immediately after decoding and reconstructing each intersection point and corresponding normal vector, this decoder process generates one oriented point.

Figure 7:
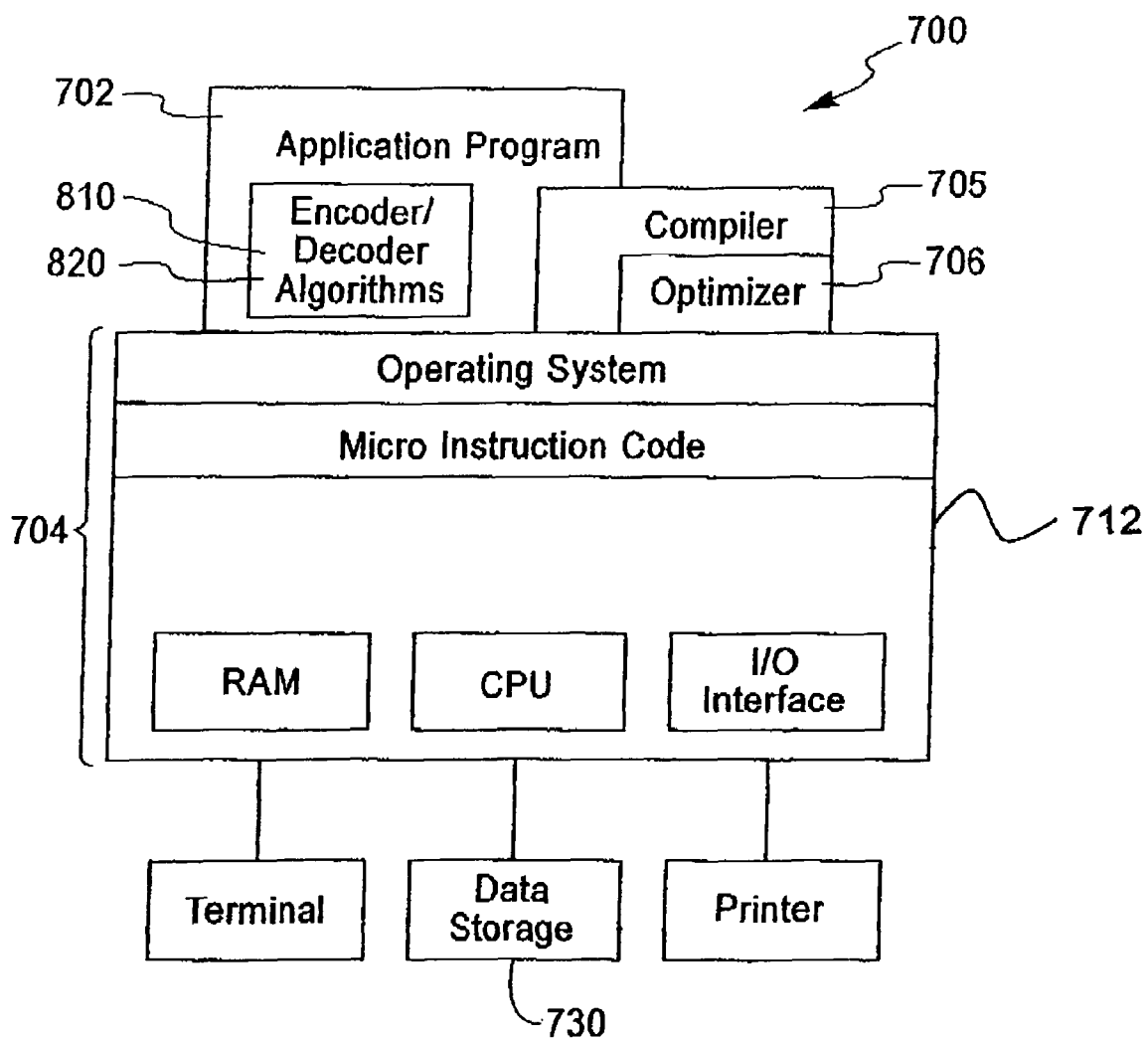
FIG. 7 is a block diagram showing an example computer system 700 on which an example of an advantageous embodiment of the present invention operates.

FIG. 7 is a block diagram showing an example of a computer system 700 on which an example of an advantageous embodiment of the present invention operates. The advantageous embodiment includes one or more application programs 702. One type of application program 702 is a compiler 705, which includes an optimizer 706. The compiler 705 and optimizer 706 are configured to transform a source program into optimized executable code. More generally, the source program is transformed to an optimized form and then into executable code. The compiler 705 and optimizer 706 operate on a computer platform 704 that includes a hardware unit 712. Some application programs 702 that run on the system 700 include the isosurface encoder method 810, and the isosurface decoder method 820.

Figure 8:
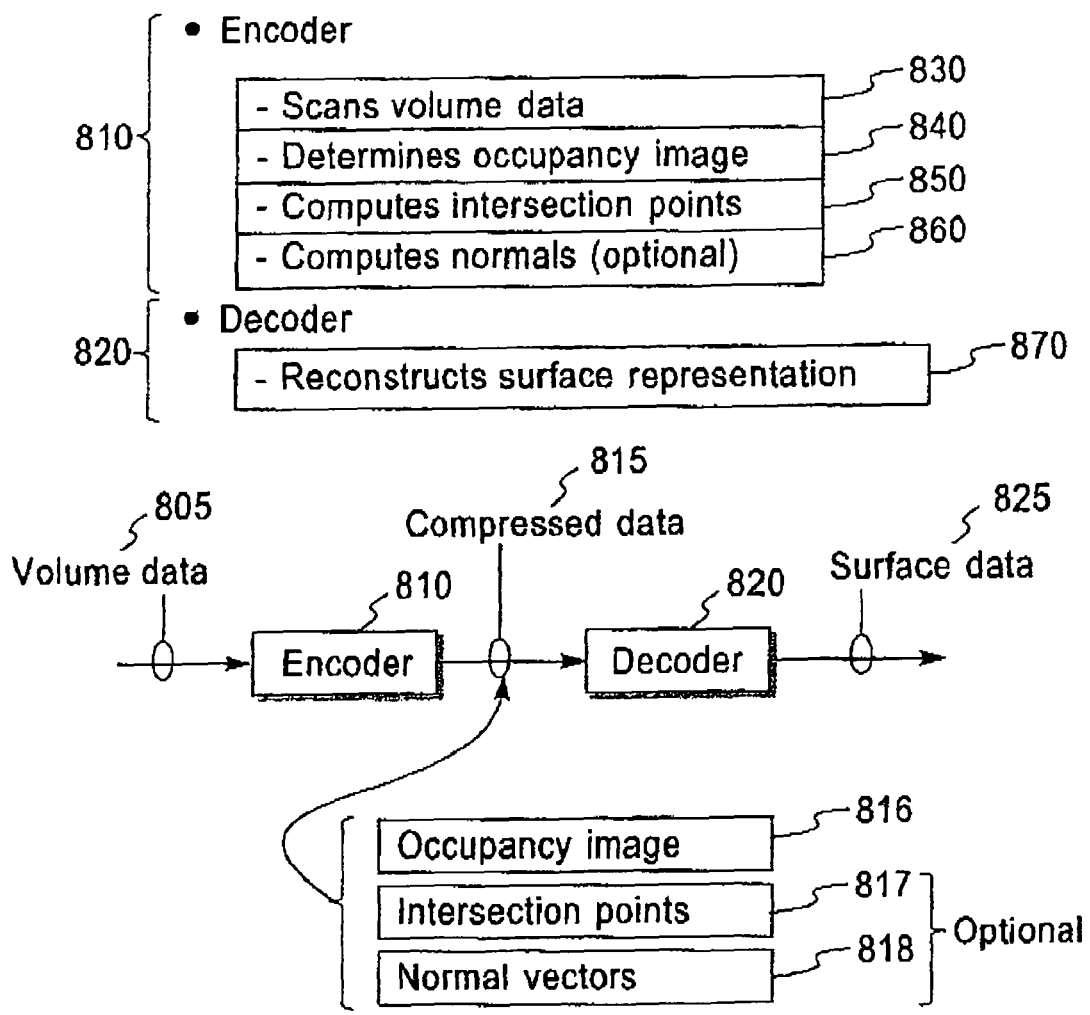
FIG. 8 is a flow chart describing the decomposition of an isosurface extraction algorithm into an encoder process and a decoder process.

FIG. 8 is a flow chart describing the decomposition of an isosurface extraction algorithm into an encoder process 810 and a decoder process 820. The encoder process 810 takes volume data 805 as input and produces compressed isosurface data 815 as output. The decoder process 820 takes compressed surface data 815 as input and produces surface data 825 as output. The compressed isosurface data 815 comprises an occupancy image record 816, an optional intersection points record 817, and an optional normal vectors record 818. The compressed isosurface data 815 can be stored in a data storage device 730 or transmitted through a network or other communication medium to a remote computer system 700, where the decoder process 820 is executed. While the encoder process 810 scans the volume data in steps 830, it determines the occupancy image in step 840, computes the intersection points in step 850, and computes the intersection point normals in step 860. In step 870 the decoder process 820 constructs a surface representation as function of the compressed data 815, which outputs as surface data 825. The intersection points record 817 and the normal vectors record 818 are optional components of the compressed isosurface data 815.

Figure 9:
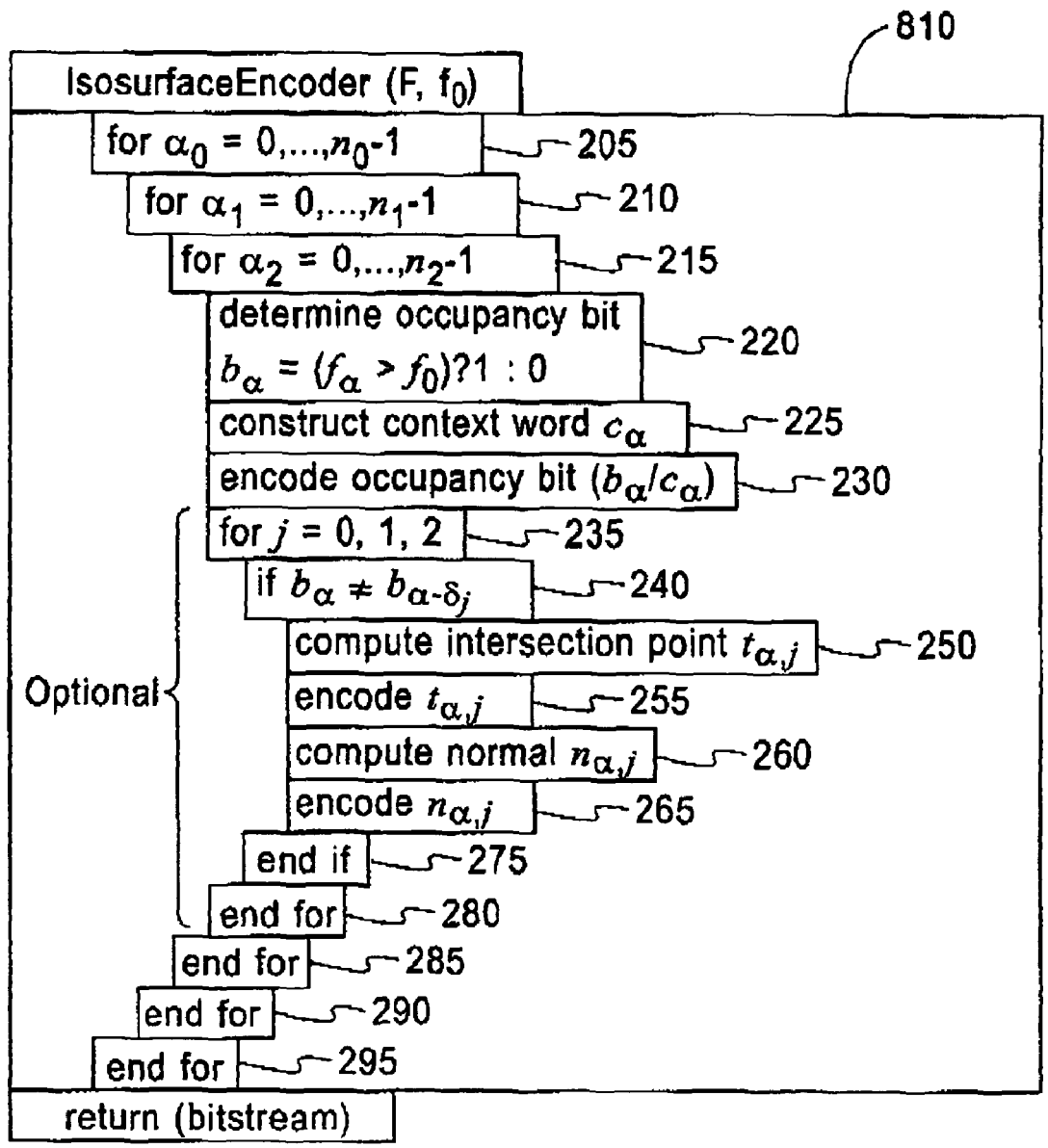
FIG. 9 is a flow chart showing the steps of an example of an advantageous embodiment of the isosurface encoder process.

FIG. 9 is a flow chart showing the steps of an example of an advantageous embodiment of the isosurface encoder process 810 of FIG. 8. While scanning the volume data in scan order, the method extracts the occupancy image 816, the set of intersection points 817, and the set of intersection point surface normals 818. The isosurface encoder process comprises three loops. Steps 205 and 295 are the beginning and end of an outer loop over the layers of the volume data. Steps 210 and 290 are the beginning and end of a middle loop over the rows of the volume data. Steps 215 and 285 are the beginning and end of an inner loop over the columns of the volume data. Inside the inner loop, in step 220 a current occupancy bit is determined by comparing a corresponding scalar function value with the isovalue. In step 225 a current context word is constructed combining occupancy bits corresponding to grid vertices previously visited. In step 230 the current occupancy bit is encoded with respect to the current context. For each grid vertex there are exactly three other grid vertices, which are neighbors of the grid vertex and precede the grid vertex in the scan order. Steps 235 and 280 are the beginning and end of a fourth loop that allows the algorithm to consider each one of the three other grid vertices and the edges joining those grid vertices with the grid vertex in sequence. In step 240 the current occupancy bit is compared with the occupancy bit corresponding to the previously visited neighbor grid vertex to determine if an intersection point exists along the edge connecting the current grid vertex and the previously visited grid vertex. If the values are different in step 250 the location of the intersection point along the edge is computed. In step 255 the location of the intersection point is encoded into intersection points record 817 of the compressed data 815. In step 260 a normal vector corresponding to the intersection point is computed as function of the volume data. In step 265 the normal vector corresponding to the intersection point is encoded into normal vectors record 818 of the compressed data 815. Steps 235, 240, 250, 255, 260, 265, 275, and 280 are optional. An embodiment implemented without these steps produces a compressed isosurface data 815 without the optional records 817 and 818.

Figure 10:
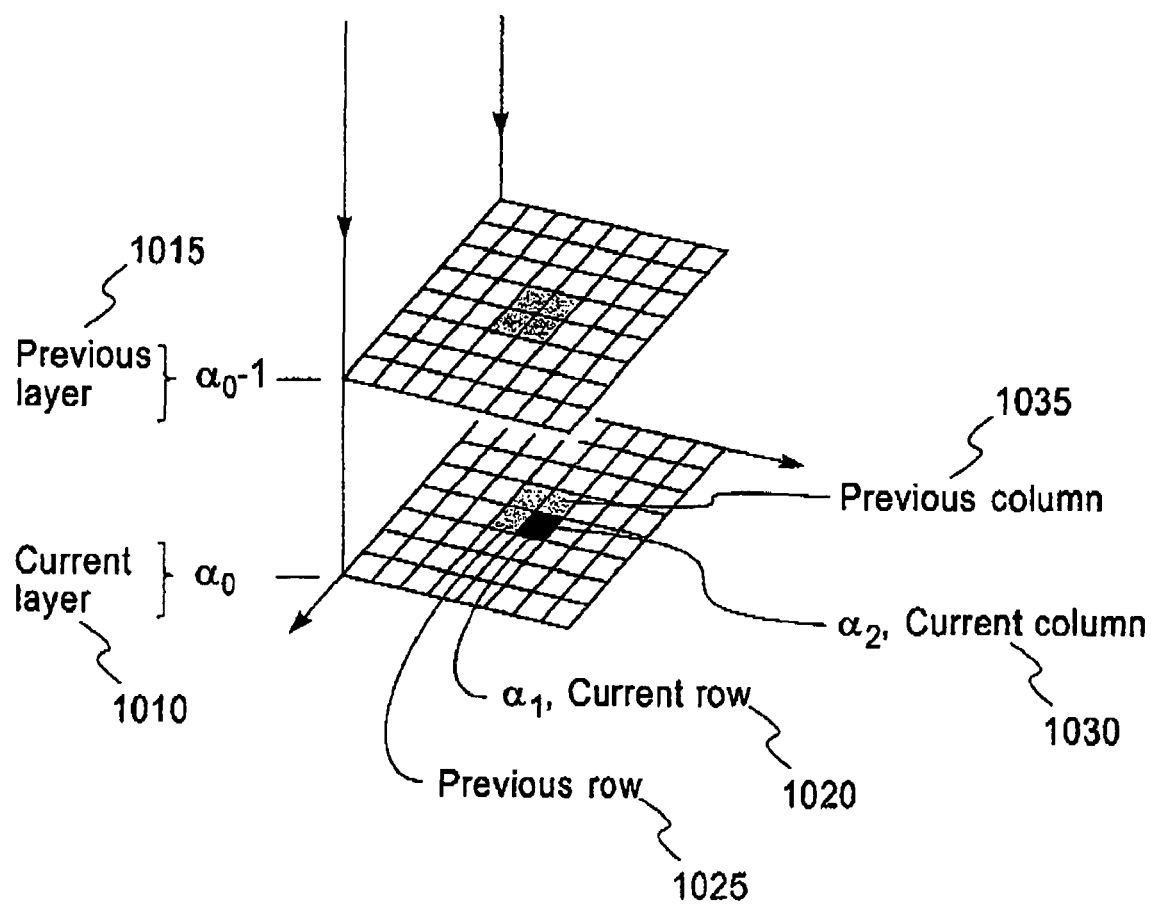
FIG. 10 is a diagram describing an example of an advantageous implementation of a step of the isosurface encoding process of FIG. 9, where the current context word is constructed combining occupancy bits corresponding to previously visited grid vertices.

FIG. 10 is a diagram describing an example of an advantageous implementation of step 225 of the isosurface encoding process 810 of FIG. 9, where the current context word is constructed combining occupancy bits corresponding to previously visited grid vertices. The location of the current grid vertex is defined by a current layer 1010, a current row 1020, and a current column 1030. The current layer 1010 is preceded by a previous layer 1015. The current row 1020 is preceded by a previous row 1025. The current column 1030 is preceded by a previous column 1035. Exactly seven other grid vertices precede the current grid vertex in the scan order. These seven other grid vertices are supported by the current or previous layer, the current or previous row, and the current or previous column. The current context word is a seven bit word constructed concatenating the values of the occupancy bits corresponding to the seven other grid vertices in scan order.

Figure 11:
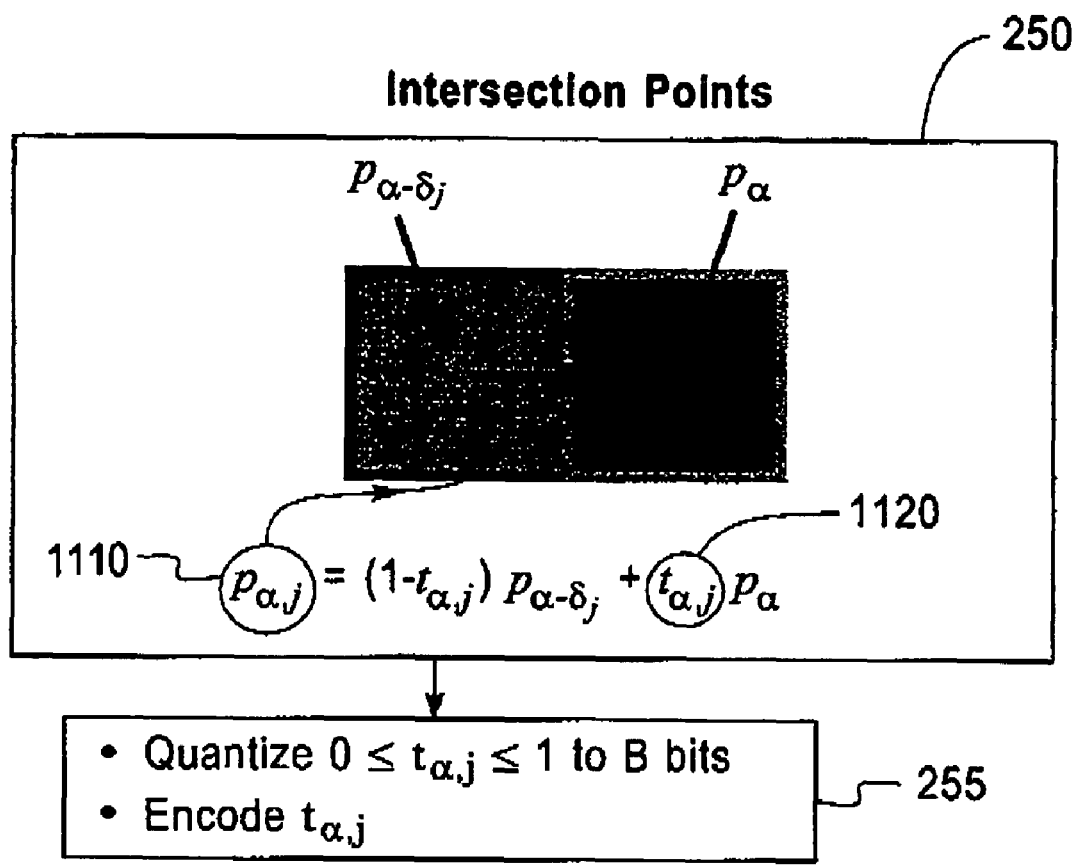
FIG. 11 is a diagram describing an example of an advantageous implementation of two steps of the isosurface encoding process of FIG. 9, where the location of an intersection point along its supporting grid edge is computed and encoded.

FIG. 11 is a diagram describing an example of an advantageous implementation of steps 250 and 255 of the isosurface encoding process 810 of FIG. 9, where the location of an intersection point 1110 along its supporting grid edge is computed and encoded. The location of the intersection point 1110 along its supporting edge is described by a normalized intersection point parameter 1120, which is a number neither less than zero nor greater than one. This number is quantized to a finite number of bits and entropy encoded in step 255.

Figure 12:
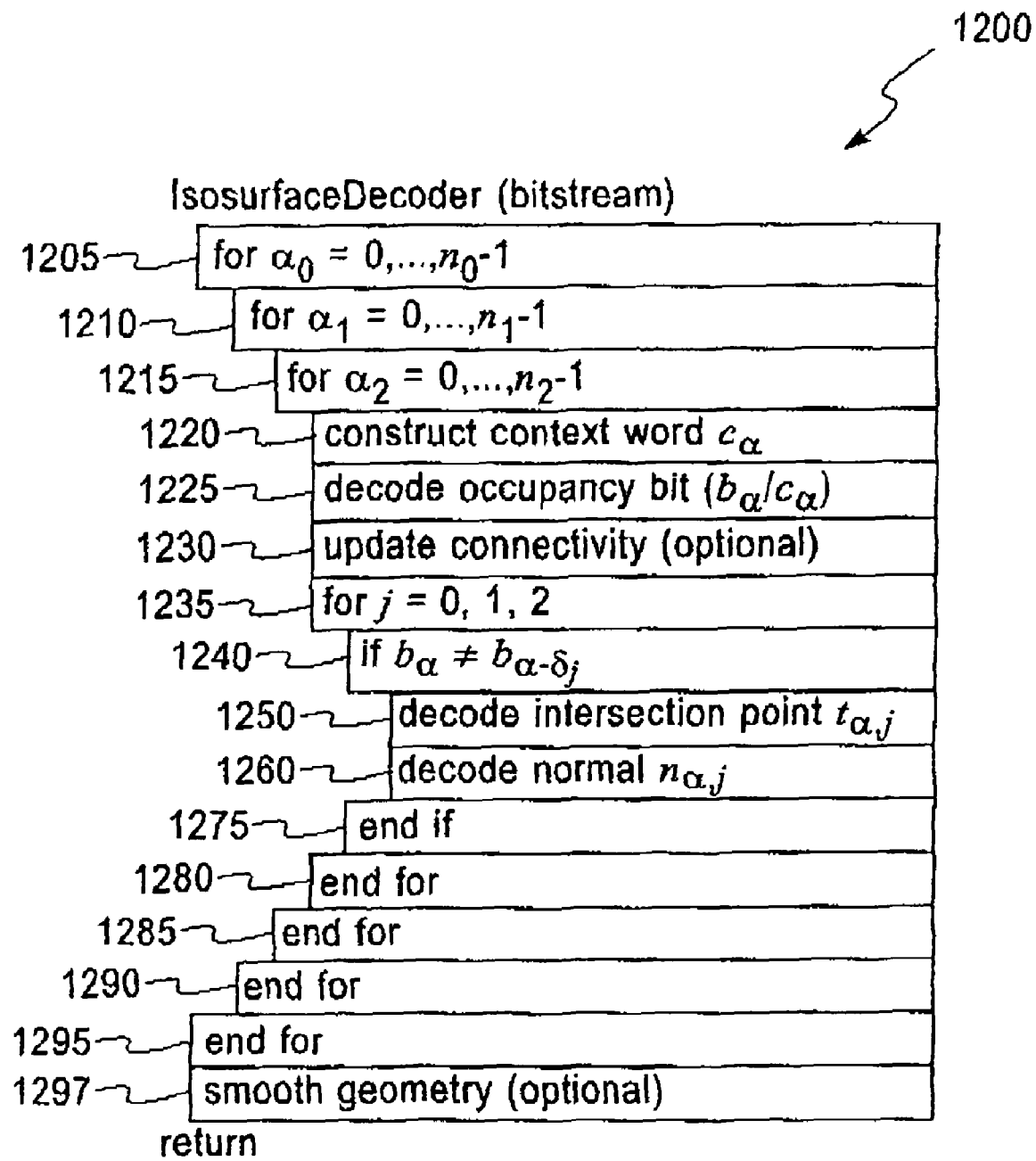
FIG. 12 is a flow chart showing the steps of an, example of an advantageous embodiment of the isosurface decoder process.

FIG. 12 is a flow chart showing the steps of an example of an advantageous embodiment 1200 of the isosurface decoder process 820 of FIG. 8. This advantageous embodiment can decode the compressed isosurface data 815 produced by the isosurface encoder process 810 with or without the optional records 817 and 818. While scanning the volume data in scan order, the method decodes the occupancy image, the intersection points, and the intersection point surface normals. This embodiment can produce either a polygon mesh or a set of oriented points as output surface representation. If producing a polygon mesh as output surface representation, from the information included in the occupancy image the method generates in step 1230 the topology and connectivity of the reconstructed polygon mesh. If producing a set of oriented points as output surface representation, step 1230 is not performed. From the location of the intersection points and the intersection point normals, the method reconstructs the geometry of the surface representation. The isosurface decoder process comprises three loops. Steps 1205 and 1295 are the beginning and end of an outer loop over the layers of the volume data. Steps 1210 and 1290 are the beginning and end of a middle loop over the rows of the volume data. Steps 1215 and 1285 are the beginning and end of an inner loop over the columns of the volume data. Inside the inner loop, in step 1220 a current context word is constructed combining occupancy bits corresponding to grid vertices previously visited. In step 1225 a current occupancy bit is decoded from the occupancy image record 816 of the compressed isosurface data 815 with respect to the current context. For each grid vertex there are exactly three other grid vertices, which are neighbors of the grid vertex and precede the grid vertex in the scan order. Steps 1235 and 1280 are the beginning and end of a fourth loop that allows the algorithm to consider each one of the three other grid vertices and the edges joining those grid vertices with the grid vertex in sequence. In step 1240 the current occupancy bit is compared with the occupancy bit corresponding to the previously visited neighbor grid vertex to determine if an intersection point exists along the edge connecting the current grid vertex and the previously visited grid vertex. If the values are different in step 1250 the location of the intersection point along the edge is determined. If the compressed isosurface data includes an intersection points record 817, then the value of the normalized intersection point parameter is decoded from the intersection points record 817. If the compressed isosurface data does not include an intersection points record 817, then the normalized intersection point parameter is set to a default value. In an example of an advantageous implementation this default value is equal to one half. In step 1260 a normal vector corresponding to the intersection point is determined. If the compressed isosurface data includes a normal vectors record 818, then the normal vector is decoded from the normal vectors record 818. If the compressed isosurface data does not include an normal vectors record 818, then intersection point normal vector is set to a default value. In an example of an advantageous implementation this default value is one of the six orientations determined by the three coordinate axes. In an example of an advantageous embodiment an additional geometry smoothing step 1297 is performed to improved the quality of the reconstructed surface representation.

Figure 13:
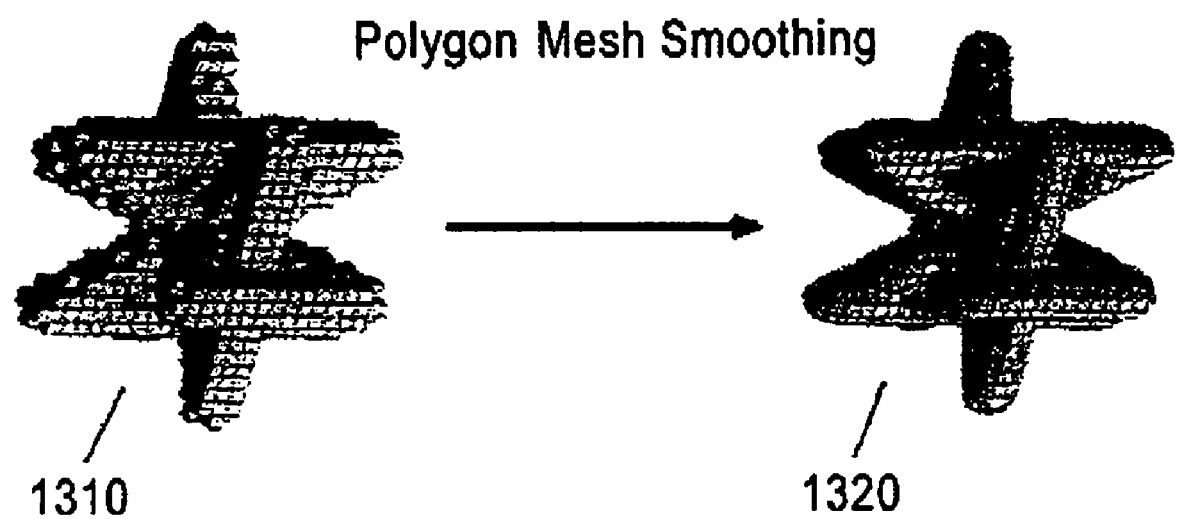
FIG. 13 is a diagram that shows the use of a smoothing algorithm as a global predictor to improve the quality of a reconstructed polygon mesh.

FIG. 13 is a diagram that shows the use of a smoothing algorithm as a global predictor to improve the quality of a reconstructed polygon mesh. The smoothing algorithm is applied to the polygon mesh 1310 reconstructed by steps 1205 to 1295 of the method of FIG. 12, producing a smoother polygon mesh 1320.

FIG. 14 is a flow chart of an in-core more advantageous embodiment 1400 of the isosurface decoder process of FIG. 12, which produces a polygon mesh as a surface representation. This advantageous implementation takes as input a compressed isosurface data 815 with neither the optional intersection points record 817 nor the normal vectors record 818. In this embodiment step 1410 replaces step 1250 of the flow chart 1200. In step 1410 the normalized intersection point parameter is set to the default value one half. In step 1420 the normal vector corresponding to the intersection point is given a default value as a function of the neighboring intersection point values. In this advantageous embodiment the smoothing step 1297 is mandatory to improve the quality of the reconstructed polygon mesh.

FIG. 15 is a flow chart of an out-of-core more advantageous embodiment 1500 of the isosurface decoder process of FIG. 12, which produces a set of oriented points as a surface representation. This advantageous implementation takes as input a compressed isosurface data 815 with the optional intersection points record 817 and the normal vectors record 818. After step 1260 this advantageous embodiment has the additional step 1510 of generating one oriented point. The output surface representation is the set of oriented points generated in step 1510.

Thus the present invention includes a data structure comprising, a memory of a computer system storing the data structure for representing an isosurface polygonal mesh, the isosurface polygonal mesh approximating a level set of a scalar function, the scalar function defined by function values and a regular three-dimensional grid, the level set defined by an isolevel, each function value associated with a node of the regular three-dimensional grid, the data structure having an occupancy record, the occupancy record including a three-dimensional occupancy image, the three-dimensional occupancy image composed of occupancy bits, each occupancy bit associated with a node of the three-dimensional grid, each occupancy bit being equal to either a first value or a second value, each occupancy bit having a corresponding function value, each occupancy bit being equal to the first value if the corresponding function value is less than the isolevel, and to the second value if the corresponding function value is higher than the isolevel.

In some embodiments of the data structure, the occupancy image is compressed using a context-based arithmetic coder, the context based arithmetic coder encoding the occupancy bit in a scanning order, the context-based arithmetic associating a context word to each occupancy bit, the context word composed of context word bits, each context word bit being a preceding occupancy bit, the preceding occupancy bits preceding the occupancy bits in the scanning order; and/or the point location values are numbers between zero and one; and/or the point location values are quantized; and/or the point location values are compressed; and/or the quantized location values are represented as one or more point bitplane three-dimensional images, and each point bitplane three-dimensional image is compressed using a context-based arithmetic; and/or the normal vectors are quantized into quantized normal vectors; and/or the normal vectors are compressed; and/or the quantized normal vectors are represented as one or more normal bitplane three-dimensional images, and each normal bitplane three-dimensional image is compressed using a context-based arithmetic coder.

In some embodiments of the data structure, the structure further comprises: an intersection record, the intersection record composed of point location values, each point location value associated with an intersecting grid edge, each intersecting grid edge having two edge ends, the edge ends being grid nodes, the two grid nodes being neighbors in the three-dimensional grid, the occupancy bits corresponding to the two grid nodes having different values; and/or a normal vector record, the normal vector record being composed of normal vectors, each normal vector being associated with an intersecting grid edge.

The invention also includes a compression method comprising: determining values of occupancy bits of an occupancy image as a function of a three-dimensional grid, a scalar function and an isolevel, the compression method visiting the nodes of the three-dimensional grid in the scanning order, comparing the function value associated with each node with the isolevel, setting a value of the occupancy bit associated with the node to a first value if the function value is less than the isolevel, and to a second value if the function value is higher than the isolevel. In some embodiments of the compression method, the method further comprising determining the point location values; and/or determining the normal vector values.

The invention also includes a decompression method comprising reconstructing an isosurface polygon mesh from an occupancy image. The method having steps outlined above and known to those skilled in the art.

The invention also includes a system comprising, a memory of a computer system storing the data structure for representing an isosurface polygonal mesh, the isosurface polygonal mesh approximating a level set of a scalar function, the scalar function defined by function values and a regular three-dimensional grid, the level set defined by an isolevel, each function value associated with a node of the regular three-dimensional grid, the data structure having an occupancy record, the occupancy record including a three-dimensional occupancy image, the three-dimensional occupancy image composed of occupancy bits, each occupancy bit associated with a node of the three-dimensional grid, each occupancy bit being equal to either a first value or a second value, each occupancy bit having a corresponding function value, each occupancy bit being equal to the first value if the corresponding function value is less than the isolevel, and to the second value if the corresponding function value is higher than the isolevel.

The invention also includes a method comprising: storing a data structure for representing an isosurface polygonal mesh, the isosurface polygonal mesh approximating a level set of a scalar function, the scalar function defined by function values and a regular three-dimensional grid, the level set defined by an isolevel, each function value associated with a node of the regular three-dimensional grid; providing the data structure with an occupancy record, the occupancy record including a three-dimensional occupancy image, the three-dimensional occupancy image composed of occupancy bits, each occupancy bit associated with a node of the three-dimensional grid, each occupancy bit being equal to either a first value or a second value, each occupancy bit having a corresponding function value; and setting each occupancy bit being equal to the first value if the corresponding function value is less than the isolevel, and to the second value if the corresponding function value is higher than the isolevel.

The invention also includes a system comprising: a memory of a computer system storing the data structure for representing an isosurface polygonal mesh, the isosurface polygonal mesh approximating a level set of a scalar function, the scalar function defined by function values and a regular three-dimensional grid, the level set defined by an isolevel, each function value associated with a node of the regular three-dimensional grid, the data structure having an occupancy record, the occupancy record including a three-dimensional occupancy image, the three-dimensional occupancy image composed of occupancy bits, each occupancy bit associated with a node of the three-dimensional grid, each occupancy bit being equal to either a first value or a second value, each occupancy bit having a corresponding function value, each occupancy bit being equal to the first value if the corresponding function value is less than the isolevel, and to the second value if the corresponding function value is higher than the isolevel.

The invention also includes a method comprising: storing a data structure for representing an isosurface polygonal mesh, the isosurface polygonal mesh approximating a level set of a scalar function, the scalar function defined by function values and a regular three-dimensional grid, the level set defined by an isolevel, each function value associated with a node of the regular three-dimensional grid, providing the data structure with an occupancy record, the occupancy record including a three-dimensional occupancy image, the three-dimensional occupancy image composed of occupancy bits, each occupancy bit associated with a node of the three-dimensional grid, each occupancy bit being equal to either a first value or a second value, each occupancy bit having a corresponding function value, setting each occupancy bit being equal to the first value if the corresponding function value is less than the isolevel, and to the second value if the corresponding function value is higher than the isolevel.

The invention also includes an article of manufacture comprising a computer usable medium having computer readable program code means embodied therein for causing data compression, the computer readable program code means in said article of manufacture comprising computer readable program code means for causing a computer to effect the steps of any method of this invention.

The invention also includes a program storage device readable by machine, tangibly embodying a program of instructions executable by the machine to perform method steps for data compression, said method steps comprising the steps of any method of this invention.

The invention also includes a computer program product comprising a computer usable medium having computer readable program code means embodied therein for causing formation of a data structure, the computer readable program code means in said computer program product comprising computer readable program code means for causing a computer to effect the functions of the present invention.

Thus, the present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be general purpose computer system with a computer program that, when being loaded and executed, controls the computer system such that it carries out the methods described herein. The present invention can also be embedded in a computer program product, that comprises all the features enabling the implementation of the methods described herein, and that—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture that comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements, timing indications and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

Having thus described our invention, what I claim as new and desire to secure by Letters Patent is as follows:

1. A method comprising an out-of-core isosurface decoder process producing a set of oriented points as a surface representation, the process comprising:
    receiving as input:
        compressed isosurface data generated by an isosurface encoder process;
        a three-dimensional grid used to define function values of a scalar function of an approximate isosurface, said three-dimensional grid comprising a plurality of grid vertices and grid edges, wherein each intersecting grid edge comprises two edge ends, the edge ends being grid nodes, the grid nodes being neighbors in the three-dimensional grid, with occupancy bits of an occupancy image corresponding to the grid nodes; wherein the occupancy bit values are a function of the three-dimensional grid, the scalar function and an isolevel, with one quantized scalar value per intersecting grid edge; and
    intersection points and intersection point surface normals;
    decoding the occupancy image, the intersection points, and the intersection point surface normals by scanning the volume data-in scan order; wherein for each grid vertex there are exactly three other grid vertices, which are neighbors of the grid vertex and precede the grid vertex in the scan order;
    reconstructing a geometry of the surface representation from a location of the intersection points and the intersection point normals;
    using an out-of-core isosurface decoder process for producing the set of oriented points as a surface representation, and the decoder process generates at least one oriented point;
    constructing a current context word by combining occupancy bits corresponding to grid vertices previously visited;
    decoding a current occupancy bit from an occupancy image record of the compressed isosurface data with respect to the current context;
    comparing the current occupancy bit with the occupancy bit corresponding to the previously visited neighbor grid vertex to determine if an intersection point exists along the edge connecting the current grid vertex and the previously visited grid vertex;
    determining the location of the intersection point along the edge if the occupancy bit values are different;
    deriving a normalized intersection point parameter;
    determining a normal vector corresponding to the intersection point parameter;
    deriving an intersection point normal vector;
    performing an additional geometry smoothing step to improve a quality of the reconstructed surface representation;

generating one oriented point after decoding and reconstructing each intersection point and corresponding normal vector; and reconstructing an isosurface polygon mesh from an occupancy image, comprising steps of:

taking compressed surface data as input and producing surface data as output, said mesh having mesh connectivity and a substantial first proportion of geometric information encoded to a fraction of a bit per Marching Cubes vertex with a context based arithmetic coder, and having any remaining second proportion of geometric information in the form of one quantized scalar value per intersecting grid edge, and specifying the location of the corresponding Marching Cubes vertex more precisely in scan-order.

2. A method as recited in claim 1, further comprising a decompression step comprising reconstructing an isosurface polygon mesh from the occupancy image.

3. The method of claim 1, wherein the step of deriving the normalized intersection point parameter comprises decoding the normalized intersection point parameter from an intersection point's record if the compressed isosurface data includes the intersection points record.

4. The method of claim 1, wherein the step of deriving the normalized intersection point parameter comprises setting the normalized intersection point parameter to a default value if the compressed isosurface data does not include the intersection points record.

5. The method of claim 1 wherein the step of deriving the intersection point normal vector comprises decoding the normal vector from the normal vectors record if said normal vectors record is included in the compressed isosurface data.

6. The method of claim 1 wherein the step of deriving the intersection point normal vector comprises setting the normal vector to a default value if the normal vector is not included in the compressed isosurface data.

7. A non-transitory computer-readable storage medium comprising:

a data structure representing an approximate isosurface, said data structure comprising:

compressed isosurface data generated by an isosurface encoder process, said compressed isosurface data comprising an encoded occupancy image, an optional intersection points record, and an optional normal vectors record;

a three-dimensional grid used to define function values of a scalar function of the approximate isosurface, said three-dimensional grid comprising a polygonal mesh structure, a plurality of grid vertices and a plurality of grid edges, a level set defined by an isolevel, each scalar function value corresponding to one grid vertex of the three-dimensional grid, and one quantized scalar value per intersecting grid edge; and an out-of-core isosurface decoder algorithm program that produces a set of oriented points as a surface representation, wherein the decoder process takes as input a compressed isosurface data with the optional intersection points record and the normal vectors record, and immediately after decoding and reconstructing each intersection point and corresponding normal vector, the decoder process generates at least one oriented point;

wherein the encoded occupancy image is the result of applying a binary encoding algorithm to an existing occupancy image, the existing occupancy image composed of occupancy bits, each occupancy bit corresponding with the grid vertex of the 3D regular grid, each occupancy bit being equal to one of a first value and a second value, and each occupancy bit having a corresponding function value, each occupancy bit being equal to the first value if the corresponding function value is less than the isolevel, and to the second value if the corresponding function value is higher than the isolevel; and wherein the data structure further comprises:

mesh connectivity and a substantial first proportion of geometric information encoded to a fraction of a bit per Marching Cubes vertex with a context based arithmetic coder;

any remaining second proportion of geometric information in a form of one quantized scalar value per intersecting grid edge;

a location of the corresponding Marching Cubes vertex being specified by being efficiently encoded in scan-order.

* * * * *